(12) United States Patent
Xia et al.

(10) Patent No.: US 11,436,155 B2
(45) Date of Patent: Sep. 6, 2022

(54) METHOD AND APPARATUS FOR ENHANCING ISOLATION OF USER SPACE FROM KERNEL SPACE

(71) Applicant: Huawei Technologies Co., Ltd., Shenzhen (CN)

(72) Inventors: Yubin Xia, Shanghai (CN); Zhichao Hua, Shanghai (CN); Zhengde Zhai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 55 days.

(21) Appl. No.: 17/038,613

(22) Filed: Sep. 30, 2020

(65) Prior Publication Data

US 2021/0011856 A1    Jan. 14, 2021

Related U.S. Application Data

(63) Continuation of application No. PCT/CN2018/095334, filed on Jul. 11, 2018.

(51) Int. Cl.
*G06F 12/00* (2006.01)
*G06F 12/1009* (2016.01)
*G06F 9/455* (2018.01)
*G06F 12/0808* (2016.01)
(Continued)

(52) U.S. Cl.
CPC ...... *G06F 12/1009* (2013.01); *G06F 9/45545* (2013.01); *G06F 9/45558* (2013.01); *G06F 12/0808* (2013.01); *G06F 12/0811* (2013.01); *G06F 12/0873* (2013.01); *G06F 2009/4557* (2013.01); *G06F 2009/45583* (2013.01);
(Continued)

(58) Field of Classification Search
CPC ........ G06F 3/06; G06F 11/1446; G06F 12/00; G06F 13/16
See application file for complete search history.

(56) References Cited

U.S. PATENT DOCUMENTS

| 8,612,711 | B1 | 12/2013 | Griffin |
| 9,274,974 | B1 | 3/2016 | Chen et al. |
| 2009/0013149 | A1 | 1/2009 | Uhlig et al. |

(Continued)

FOREIGN PATENT DOCUMENTS

| CN | 101882113 A | 11/2010 |
| CN | 103164348 A | 6/2013 |

(Continued)

OTHER PUBLICATIONS

Jian-Bao, R., et al., "Transparent Privacy Protection Based on Virtual Machine Monitor," Journal of Software, 2015, vol. 26, No. 8, with partial English translation, pp. 2124-2137.

(Continued)

*Primary Examiner* — Arvind Talukdar
(74) *Attorney, Agent, or Firm* — Conley Rose, P.C.

(57) ABSTRACT

A method and an apparatus for enhancing isolation of user space from kernel space, to divide an extended page table into a kernel-mode extended page table and a user-mode extended page table, such that user-mode code cannot access some or all content in the kernel space, and/or kernel-mode code cannot access some content in the user space, thereby enhancing isolation of the user space from the kernel space and preventing content leakage of the kernel space.

20 Claims, 8 Drawing Sheets

(51) Int. Cl.
 *G06F 12/0811* (2016.01)
 *G06F 12/0873* (2016.01)
(52) U.S. Cl.
 CPC .............. *G06F 2009/45587* (2013.01); *G06F 2009/45591* (2013.01)

(56) References Cited

U.S. PATENT DOCUMENTS

| | | |
|---|---|---|
| 2009/0300263 A1 | 12/2009 | Devine et al. |
| 2009/0300612 A1 | 12/2009 | Devine et al. |
| 2013/0283004 A1 | 10/2013 | Devine et al. |
| 2014/0006734 A1 | 1/2014 | Li et al. |
| 2016/0048464 A1 | 2/2016 | Nakajima et al. |
| 2016/0299851 A1 | 10/2016 | Mattson, Jr. et al. |
| 2016/0364341 A1 | 12/2016 | Banginwar et al. |
| 2018/0081829 A1* | 3/2018 | Kaplan ............... G06F 21/6281 |
| 2018/0173551 A1 | 6/2018 | Dunn et al. |
| 2018/0276081 A1 | 9/2018 | Zhang |
| 2019/0361815 A1* | 11/2019 | Tsirkin ................ G06F 12/1491 |

FOREIGN PATENT DOCUMENTS

| | | |
|---|---|---|
| CN | 103257936 A | 8/2013 |
| CN | 103955438 A | 7/2014 |
| CN | 104036185 A | 9/2014 |
| CN | 104809401 A | 7/2015 |
| CN | 105446834 A | 3/2016 |
| CN | 106201646 A | 12/2016 |
| CN | 107391225 A | 11/2017 |
| CN | 107479946 A | 12/2017 |
| CN | 107797895 A | 3/2018 |

OTHER PUBLICATIONS

Joe Osborne:"Don"t download Intel"s latest Spectre and Meltdown patch, Intel warns," Jan. 22, 2018, Retrieved from the internet:https://www.techradar.com/news/dont-download-intels-latest-spectre-and-meltdown-patch-intel-warns, 5 pages.
Coldewey, D., "Linus Torvalds declares Intel fix for Meltdown/Spectre, Complete and Utter Garbage ", Jan. 23, 2018, retrieved from the internet:https://techcrunch.com/2018/01/22/linus-torvalds-declares-intel-fix-for-meltdown-spectre-complete-and-utter-garbage/, 6 pages.
Lee., J., et al., "POSTER: Page Table Manipulation Attack", Published 2015,Computer Science, 3 pages.
Ye., Y., et al., "A Code Reuse Attack Protection Technique Based on Code Anti-Leakage", Journal of Computer Research and Development, issn1000-1239, Apr. 23, 2016, 11 pages.
Shingo Aoyagi et al, IXIV VMM: a VMM on 2-Level Ring Architecture, IEEE 8th International Conference on Computer and Information Technology Workshops, Jul. 2008, 6 pages, XP031288303.
Ruifeng Liu et al., Cuckoo Migration: Self Migration on JointCloud Using New Hardware Features, 2018 IEEE Symposium on Service-Oriented System Engineering, Mar. 2018, 6 pages, XP033340480.

* cited by examiner

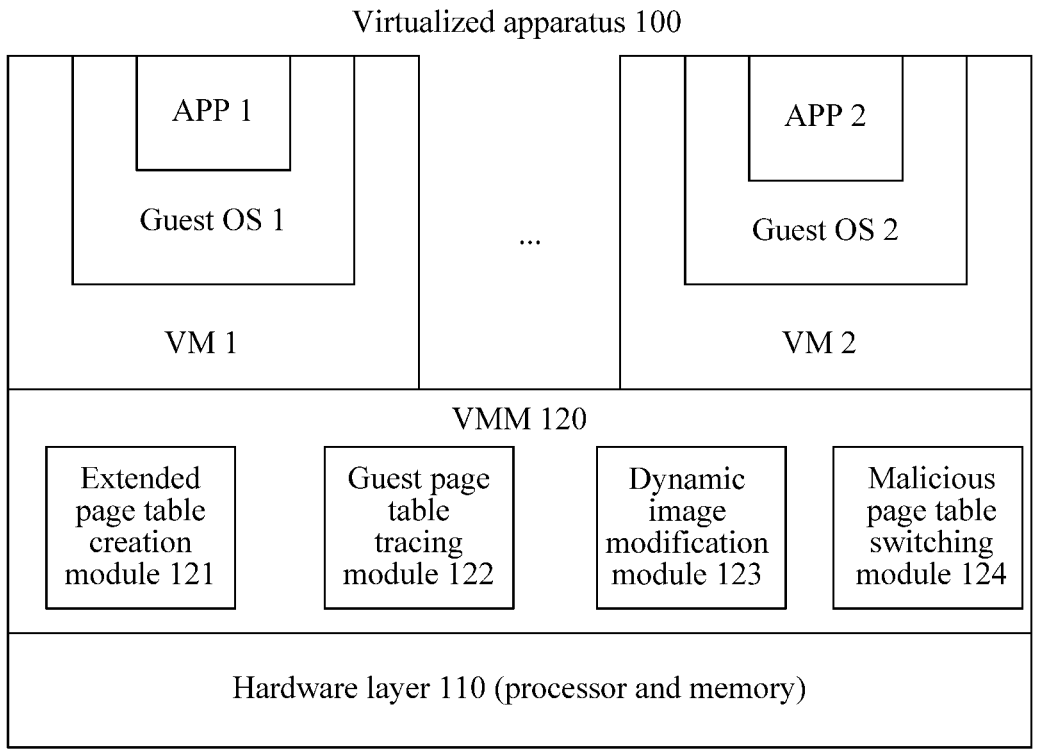

Create at least two extended page tables, where the at least two extended page tables include a user-mode extended page table and a kernel-mode extended page table, the user-mode extended page table is used to be called, when a virtual machine executes user-mode code, by a processor running the virtual machine, and the kernel-mode extended page table is used to be called, when the virtual machine executes kernel-mode code, by the processor running the virtual machine — S110

Perform mapping processing on the user-mode extended page table and/ or the kernel-mode extended page table, where some or all page-table pages in a guest page table that are used to translate a kernel-mode guest virtual address are mapped to an invalid page-table page by using the user-mode extended page table, and/or some page-table pages in the guest page table that are used to translate a user-mode guest virtual address are mapped to an invalid page-table page by using the kernel-mode extended page table — S120

FIG. 4

METHOD AND APPARATUS FOR ENHANCING ISOLATION OF USER SPACE FROM KERNEL SPACE

CROSS-REFERENCE TO RELATED APPLICATIONS

This application is a continuation of International Patent Application No. PCT/CN2018/095334, filed on Jul. 11, 2018, the disclosure of which is hereby incorporated by reference in its entirety.

TECHNICAL FIELD

This application relates to the field of computers, and in particular, to a method and an apparatus for enhancing isolation of user space from kernel space.

BACKGROUND

Because a memory access speed of a processor is greatly different from a computing speed of the processor, to improve performance, modern processors widely use a cache mechanism to cache data in a memory at a high speed. When accessing a memory address, a processor first checks whether content at the memory address is already cached in a cache module. If yes, the processor directly obtains the content from the cache module. In this case, an access time is greatly reduced. If not, the processor reads data from a memory and caches the data in the cache module, and when accessing the address next time, the processor may directly obtain the corresponding content from the cache module.

The foregoing mechanism helps improve computer performance. However, complexity of a cache system easily causes some design defects, resulting in system vulnerabilities that may be maliciously used. A malicious application may use these vulnerabilities to breach isolation of an application from a kernel, resulting in kernel information leakage, or a malicious application may use these vulnerabilities to cheat a kernel to execute malicious code. For example, a well-known meltdown vulnerability is caused because impact on a cache caused by speculative execution of a processor is not eliminated when the processor rolls back. This results in a cache side channel, and consequently a malicious application may detect content of any kernel address. For another example, a malicious application may use a feature that application space and kernel space are both in same process address space, to cheat a kernel to directly redirect to execute application code, to perform a privilege escalation attack. These are all caused because isolation of an application from a kernel is breached. The failed isolation causes leakage of confidential data of the kernel or causes the kernel to be cheated to execute malicious application code, or the like.

SUMMARY

This application provides a method and an apparatus for enhancing isolation of user space from kernel space, to divide an extended page table into a kernel-mode extended page table and a user-mode extended page table. As such, user-mode code cannot access some or all content in the kernel space, and/or kernel-mode code cannot access some content in the user space, thereby enhancing isolation of the user space from the kernel space and preventing content leakage of the kernel space.

According to a first aspect, a method for enhancing isolation of user space from kernel space is provided, applied to a virtualized system including a virtual machine and a virtual machine monitor, where the virtual machine monitor is configured to manage the virtual machine. The method includes: creating, by the virtual machine monitor, at least two extended page tables, where the at least two extended page tables include a user-mode extended page table and a kernel-mode extended page table, the user-mode extended page table is used to be called, when the virtual machine executes user-mode code, by a processor running the virtual machine, and the kernel-mode extended page table is used to be called, when the virtual machine executes kernel-mode code, by the processor running the virtual machine; and performing, by the virtual machine monitor, mapping processing on the user-mode extended page table and/or the kernel-mode extended page table, where some or all page-table pages in a guest page table that are used to translate a kernel-mode guest virtual address are mapped to an invalid page-table page using the user-mode extended page table, and/or some page-table pages in the guest page table that are used to translate a user-mode guest virtual address are mapped to an invalid page-table page using the kernel-mode extended page table.

When an application requests to access a guest virtual address, the virtual address is first translated to a guest physical address. If the current virtual machine executes the kernel-mode code, the processor searches for the kernel-mode extended page table. Alternatively, if the current virtual machine executes the user-mode code, the processor searches for the user-mode extended page table. Subsequently, the processor determines, based on a target extended page table, a host physical address corresponding to the guest physical address, and subsequently reads content stored in the host physical address. Because the user-mode extended page table maps, to an invalid page-table page, the page-table pages in the guest page table that are used to translate a kernel-mode guest virtual address, the kernel-mode guest virtual address cannot be successfully translated to a host physical address, that is, the host physical address cannot be successfully accessed, thereby enhancing isolation of the user space from the kernel space. In addition, because the kernel-mode extended page table maps, to an invalid page-table page, some page-table pages in the guest page table that are used to translate a user-mode guest virtual address, the user-mode guest virtual address cannot be successfully translated to a host physical address, that is, the host physical address cannot be successfully accessed, thereby enhancing isolation of the user space from the kernel space.

In addition, only the extended page table needs to be switched in the solution, and a rate of switching the extended page table is higher than that of switching the guest page table. In addition, a translation lookaside buffer (TLB) does not need to be emptied to switch the extended page table. Therefore, compared with a solution of enhancing isolation of the user space from the kernel space by switching the guest page table, the solution provided in this application reduces impact on application performance while avoiding content leakage of the kernel space.

Optionally, the invalid page-table page is a host physical page whose content is all 0, or a host physical page whose content is other data that can prevent the guest virtual address from being successfully translated, for example, a host physical page whose content is all 255.

Optionally, before the creating, by the virtual machine monitor, at least two extended page tables, the method further includes determining, by the virtual machine monitor, the page-table pages in the guest page table that are used to translate the kernel-mode guest virtual address.

Because a page-table page in the guest page table that is used to translate a kernel-mode guest virtual address changes, the solution can dynamically capture the page-table page in the guest page table that is used to translate the kernel-mode guest virtual address, and prevent the user-mode extended page table from mapping the page-table page to a corresponding host physical page, thereby enhancing isolation of the user space from the kernel space.

Optionally, the guest page table includes a fourth-level page-table page and a third-level page-table page. Additionally, the determining, by the virtual machine monitor, the page-table pages in the guest page table that are used to translate the kernel-mode guest virtual address includes determining, by the virtual machine monitor, the third-level page-table page in the guest page table that is used to translate the kernel-mode guest virtual address.

Because a guest virtual address range managed by a fourth-level page-table page is excessively large, a page-table page used to translate a kernel-mode guest virtual address and a page-table page used to translate a user-mode guest virtual address cannot be distinguished at a level of the fourth-level page table. In addition, because a quantity of third-level page-table pages is less than a quantity of second-level page-table pages and a quantity of first-level page-table pages, the solution can reduce costs of tracing a guest page-table page while tracing, in real time, the page-table page in the guest page table that is used to translate the kernel-mode guest virtual address.

Optionally, the determining, by the virtual machine monitor, the third-level page-table page in the guest page table that is used to translate the kernel-mode guest virtual address includes: setting, by the virtual machine monitor, a read-write attribute of the third-level page-table page in the guest page table that is used to translate the kernel-mode guest virtual address to the virtual machine being only capable of reading, where the page-table page in the guest page table that the virtual machine is only capable of reading is used to trigger the virtual machine to exit when being modified by the virtual machine; when the virtual machine is triggered to exit, determining, by the virtual machine monitor, whether the third-level page-table page in the guest page table that is used to translate the kernel-mode guest virtual address is fully filled; when the third-level page-table page in the guest page table that is used to translate the kernel-mode guest virtual address is fully filled, setting, by the virtual machine monitor, read-write attributes of all fourth-level page-table pages in the guest page table to the virtual machine being only capable of reading; performing, by the virtual machine monitor, an entering operation of the virtual machine; when the virtual machine is triggered to exit again, determining, by the virtual machine monitor, whether the fourth-level page-table page is modified; and when the fourth-level page-table page is modified, determining, by the virtual machine monitor based on the modified fourth-level page-table page, a newly added third-level page-table page in the guest page table that is used to translate the kernel-mode guest virtual address.

When the third-level page-table page in the guest page table that is used to translate the kernel-mode guest virtual address is fully filled, a third-level page-table page used to translate a kernel-mode guest virtual address may need to be newly added, and the fourth-level page-table page needs to be modified to newly add the third-level page-table page. Therefore, the read-write attribute of the fourth-level page-table page is set to the virtual machine being only capable of reading, and a modification status of the fourth-level page-table page may be monitored. When the virtual machine modifies the fourth-level page-table page, the virtual machine is triggered to exit. The virtual machine monitor checks whether the fourth-level page-table page is modified, and determines, based on the modified fourth-level page-table page, the third-level page-table page newly added to the guest page table to translate the kernel-mode guest virtual address, thereby avoiding that the third-level page-table page newly added to the guest page table to translate the kernel-mode guest virtual address is omitted and consequently an application accesses kernel content using the third-level page-table page, to enhance isolation of the user space from the kernel space.

Optionally, the method further includes: mapping, by the virtual machine monitor, the third-level page-table page and the fourth-level page-table page whose read-write attributes are the virtual machine being only capable of reading in the guest page table to a first guest physical address, where the first guest physical address and a second guest physical address are different from each other, a read-write attribute of the first guest physical address in the kernel-mode extended page table is the virtual machine being only capable of reading, a read-write attribute of the second guest physical address in the user-mode extended page table and the kernel-mode extended page table is the virtual machine being capable of reading and writing, the first guest physical address is a guest physical address used by the virtual machine, the second guest physical address is a guest physical address used by the processor during address translation, and the first guest physical address and the second guest physical address are mapped to a same host physical address.

Each time using a page-table page in the guest page table to translate a guest virtual address, the processor adds a particular access bit to the used page-table page. Therefore, if a read-write attribute of the page-table page is the virtual machine being only capable of reading, massive exit of the virtual machine is triggered, affecting performance of the virtual machine. In the solution provided in this application, a guest physical address used by the virtual machine is separated from a guest physical address used by the processor, and both are mapped to a same host physical address. Therefore, this may avoid that the virtual machine is triggered to exit because the processor uses the page-table page to translate an address while the page-table page in the guest page table that is used to translate the kernel-mode guest virtual address is traced.

Optionally, before the determining, by the virtual machine monitor, the page-table pages in the guest page table that are used to translate the kernel-mode guest virtual address, the method further includes: obtaining, by the virtual machine monitor, base address modification information, where the base address modification information is used to indicate a storage location of the guest page table; and obtaining, by the virtual machine monitor, the guest page table based on the base address modification information.

If the virtual machine switches, the guest page table used by the virtual machine also changes. Therefore, the virtual machine monitor may obtain a currently used guest page table by obtaining the base address modification information, thereby tracing the page-table page that is in the guest page table currently used by the virtual machine and that is used to translate the kernel-mode guest virtual address.

Optionally, the virtual machine monitor is on a first host; before the creating, by the virtual machine monitor, at least two extended page tables, the method further includes: migrating, by the virtual machine monitor, the virtual machine from the first host to a second host using a virtual machine hot migration technology, where the virtual machine monitor of the first host does not include the user-mode extended page table and the kernel-mode extended page table; writing, by the virtual machine monitor, first switching code at a virtual machine kernel-mode entry of the first host, and writing second switching code at a virtual machine kernel-mode exit of the first host, where the first switching code is used to switch the user-mode extended page table to the kernel-mode extended page table, and the second switching code is used to switch the kernel-mode extended page table to the user-mode extended page table; and after the performing, by the virtual machine monitor, mapping processing on the user-mode extended page table and/or the kernel-mode extended page table, the method further includes: migrating, by the virtual machine monitor, the virtual machine from the second host to the first host using the virtual machine hot migration technology.

In the method provided in this application, the page-table page in the guest page table is mapped to different host physical addresses using different extended page tables, to enhance isolation of the user space from the kernel space, and the guest page table does not need to be processed. Therefore, a service of the virtual machine does not need to be interrupted. A running virtual machine may be migrated to a normally running host (that is, the second host) using the virtual machine hot migration technology, an extended page table and a kernel-mode exit and a kernel-mode entry of the virtual machine are subsequently processed on the first host, and the virtual machine is migrated back to the first host after processing is completed, to enhance security of the virtual machine without interrupting a service.

Optionally, the first switching code and the second switching code are used to call an extended page table switching function of a processor of the first host.

The extended page table switching function of the processor is used to switch the extended page table, to avoid triggering the virtual machine to exit, thereby improving performance of the virtual machine.

According to a second aspect, an apparatus for enhancing isolation of user space from kernel space is provided. The apparatus can perform the functions corresponding to the steps in the method according to the first aspect, and the functions may be performed using hardware or may be performed by executing corresponding software by hardware. The hardware or software includes one or more units or modules corresponding to the foregoing functions.

In a possible design, the apparatus includes a processor. The processor is configured to support the apparatus in executing the corresponding functions in the method according to the first aspect. The apparatus may further include a memory. The memory is configured to couple to the processor, and store a program instruction and data that are required by the apparatus. Optionally, the apparatus further includes a communications interface. The communications interface is configured to support the apparatus in communication with another network element.

According to a third aspect, a computer-readable storage medium is provided. The computer-readable storage medium stores computer program code, and when the computer program code is executed by a processing unit or a processor, the apparatus for enhancing isolation of user space from kernel space is enabled to perform the method according to the first aspect.

According to a fourth aspect, a chip is provided, storing an instruction. When the instruction runs on the apparatus for enhancing isolation of user space from kernel space, the chip is enabled to perform the method according to the first aspect.

According to a fifth aspect, a computer program product is provided. The computer program product includes computer program code. When the computer program code is run by a processing unit or a processor of the apparatus for enhancing isolation of user space from kernel space, the apparatus for enhancing isolation of user space from kernel space is enabled to perform the method according to the first aspect.

According to a sixth aspect, a virtualized system is provided. The system includes a virtual machine monitor and a virtual machine, the virtual machine monitor is configured to manage the virtual machine, and the virtual machine monitor includes an extended page table creation module configured to: create at least two extended page tables, where the at least two extended page tables include a user-mode extended page table and a kernel-mode extended page table, the user-mode extended page table is used to be called, when the virtual machine executes user-mode code, by a processor running the virtual machine, and the kernel-mode extended page table is used to be called, when the virtual machine executes kernel-mode code, by the processor running the virtual machine; and perform mapping processing on the user-mode extended page table and/or the kernel-mode extended page table, where some or all page-table pages in a guest page table that are used to translate a kernel-mode guest virtual address are mapped to an invalid page-table page using the user-mode extended page table, and/or some page-table pages in the guest page table that are used to translate a user-mode guest virtual address are mapped to an invalid page-table page using the kernel-mode extended page table.

BRIEF DESCRIPTION OF DRAWINGS

FIG. 3 is a schematic diagram of a virtualized apparatus according to this application;

FIG. 4 is a schematic diagram of a method for enhancing isolation of user space from kernel space according to this application;

DESCRIPTION OF EMBODIMENTS

For ease of understanding technical solutions of this application, concepts in this application are first briefly described.

A virtual machine (VM) is a virtual device simulated on a physical device using virtual machine software. For application programs running in virtual machines, the virtual machines work like real physical devices, a guest operating system (OS) and an application program may be installed in the virtual machine, and the virtual machine may further access a network resource.

A VM monitor (VMM) is configured to virtualize a plurality of virtual running environments on a physical machine, and each virtual running environment has a function the same as that of a real machine.

The following describes the technical solutions of this application with reference to accompanying drawings.

Figure 1:
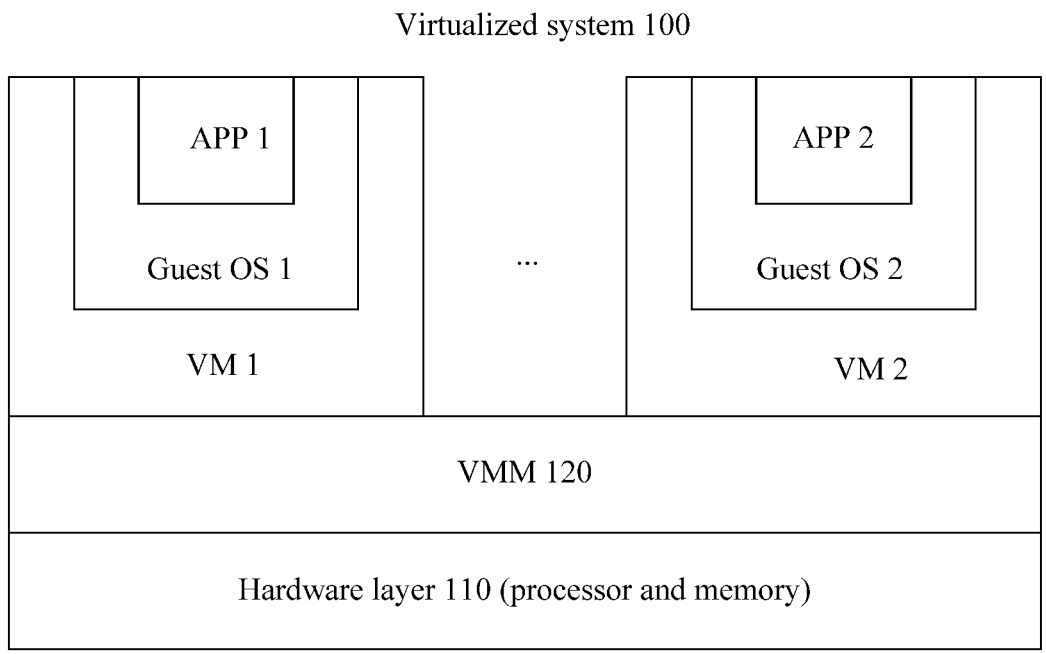
FIG. 1 is a schematic diagram of a virtualized system applicable to this application.

FIG. 1 shows a virtualized system applicable to this application.

The virtualized system 100 includes: a host 110 providing hardware resources such as a central processing unit (CPU), a memory, and an input/output (I/O) device for a VM; and a VMM 120 mapping a hardware resource provided by the host 110 to a virtual resource using a hardware drive program, for use by the VM, for example, mapping physical address space to virtual address space.

One or more VMs run on the VM 120, a VM may also be referred to as a guest, a guest OS runs on each VM, and one or more applications (APPs) run in each guest OS.

In the virtualized system, the CPU runs a guest OS kernel and an APP in a VM using different levels of permission, runs the guest OS kernel using a kernel mode, and runs the APP in the VM using a user mode. When the VM executes a kernel-mode program, the VM is in the kernel mode, and when the VM executes a user-mode program, the VM is in the user mode. Usually, an APP has a relatively low level of permission, content in kernel space cannot be directly read and modified, and the VM needs to switch from the user mode to the kernel mode to start executing the kernel-mode program. The guest OS kernel is a kernel-mode program, and the APP is a user-mode program.

The guest OS kernel and the APP both require virtual address space (which may also be referred to as "virtual space") during running, the guest OS kernel runs in kernel-mode virtual space (which may also be referred to as the "kernel space"), the kernel space stores code and data of the guest OS kernel, and a guest virtual address (GVA) belonging to the kernel space is referred to as a kernel-mode GVA. The APP runs in user-mode virtual space (which may also be referred to as "user space"), the user space stores code and data of the APP, and a GVA belonging to the user space is referred to as a user-mode GVA.

The user-mode program or the kernel-mode program in the VM accesses data using a GVA, the GVA can be translated to a guest physical address (GPA) using a guest page table (GPT), and the GPA can be translated to a host physical address (HPA) using an extended page table.

Processors provided by different producers may use different guest page tables and extended page tables. For example, a page table used by an Intel processor to translate a GPA is referred to as an extended page table (EPT), and a page table used by an Advanced Micro Devices (AMD) processor to translate a GPA is referred to as a nested page table (NPT). Because the EPT and the NPT are both used to further translate a translation result of a GPT, the EPT and the NPT may be collectively referred to as extended page tables. This application uses the Intel processor as an example for description, but it does not indicate that the technical solutions provided in this application can be applied to only the Intel processor.

Figure 2:
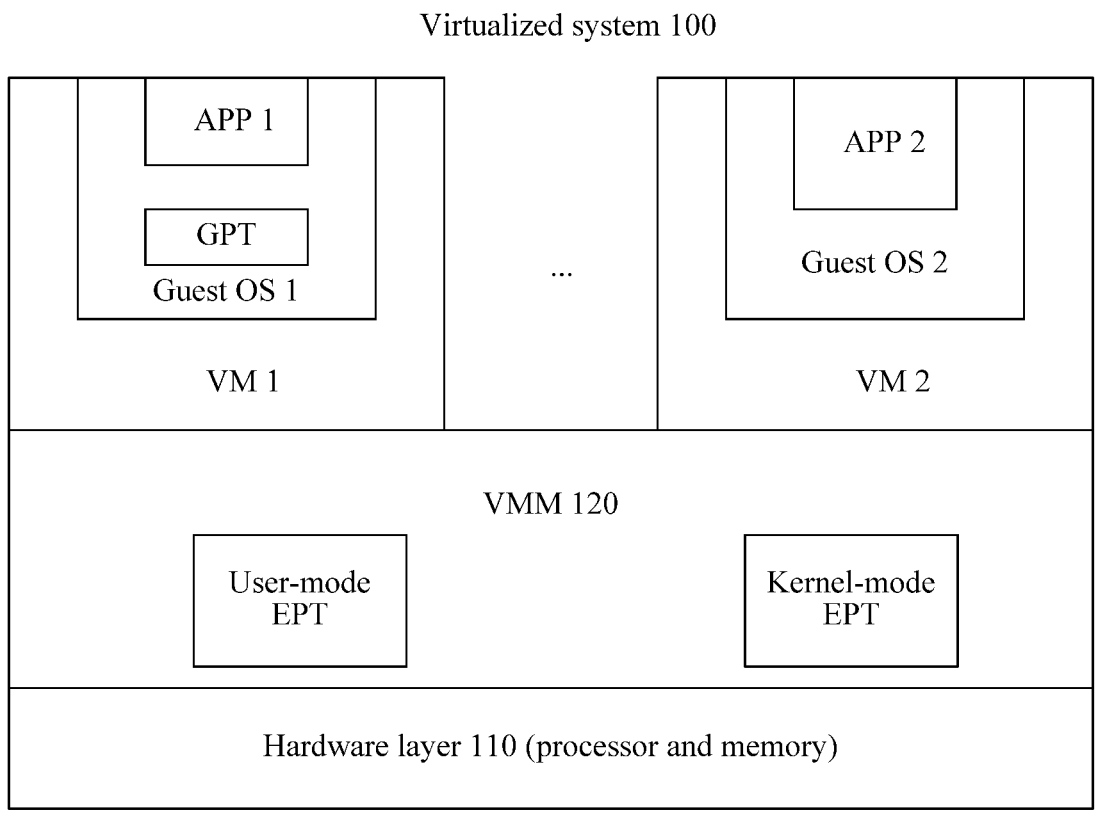
FIG. 2 is a schematic diagram of a virtualized system according to this application.

FIG. 2 shows a virtualized system applicable to an Intel processor according to this application.

As shown in FIG. 2, a GPT is stored in a guest OS 1, and an EPT is stored in a VMM 120. EPTs in the VMM 120 are classified into two types: a user-mode EPT and a kernel-mode EPT. When a VM 1 is in a user mode, a user-mode GVA is translated to a GPA using a GPT, and the GPA is translated to an HPA using a user-mode EPT. When the VM 1 is in a kernel mode, a kernel-mode GVA is translated to a GPA using a GPT, and the GPA is translated to an HPA using a kernel-mode EPT.

Because the VMM 120 maps different GPAs using different EPTs, the VMM 120 may control a process of mapping a GVA to an HPA. For example, when an APP requests to access a kernel-mode GVA, the VMM 120 may block translation from the kernel-mode GVA to an HPA, to prevent the APP from randomly reading content in kernel space. Therefore, the virtualized system shown in FIG. 2 can enhance isolation of the kernel space from user space.

FIG. 3 shows a virtualized apparatus according to this application, which can be used to create the virtualized system shown in FIG. 2.

As shown in FIG. 3, the virtualized apparatus includes an extended page table creation module 121, a guest page table tracing module 122, a dynamic image modification module 123, and a malicious page table switching defense module 124.

The extended page table creation module 121 is responsible for creating a user-mode EPT and a kernel-mode EPT for a VM. The guest page table tracing module 122 is responsible for tracing a GPT modification made by the VM, to help the extended page table creation module 121 to adjust EPT content in real time. The dynamic image modification module 123 is responsible for inserting EPT switching code into a VM kernel image, and switching a corresponding EPT when the VM switches between a user mode and a kernel mode. Finally, the malicious page table switching defense module 124 is responsible for preventing a malicious APP from switching the user-mode EPT to the kernel-mode EPT when the VM is in the user mode.

The following describes functions of the foregoing modules in detail.

A method for enhancing isolation of user space from kernel space provided in this application is described below based on the virtualized system shown in FIG. 2.

FIG. 4 shows a method 100 for enhancing isolation of user space from kernel space according to this application. The method may be applied to a VMM 120, that is, the method 100 may be performed by an extended page table creation module 121 in the VMM 120. The method 100 includes the following.

S110: Create at least two extended page tables, where the at least two extended page tables include a user-mode extended page table and a kernel-mode extended page table, the user-mode extended page table is used to be called, when a virtual machine executes user-mode code, by a processor running the virtual machine, and the kernel-mode extended page table is used to be called, when the virtual machine executes kernel-mode code, by the processor running the virtual machine.

S120: Perform mapping processing on the user-mode extended page table and/or the kernel-mode extended page table, where some or all page-table pages in a guest page table that are used to translate a kernel-mode guest virtual address are mapped to an invalid page-table page using the user-mode extended page table, and/or some page-table pages in the guest page table that are used to translate a user-mode guest virtual address are mapped to an invalid page-table page using the kernel-mode extended page table.

When an APP requests to access a kernel-mode GVA, the GVA is first translated to a corresponding GPA by a GPT. If the current VM is in a kernel mode, the processor searches for a kernel-mode EPT; or if the current VM is in a user mode, the processor searches for a user-mode EPT.

Subsequently, the processor determines, based on a target extended page table, an HPA corresponding to the GPA, and subsequently reads content stored in kernel space corresponding to the HPA. Because the user-mode EPT maps, to an invalid page-table page, some or all page-table pages in the GPT that are used to translate a kernel-mode GVA, a virtual machine kernel-mode address cited in the user-mode code cannot be successfully translated to a corresponding host physical address, thereby enhancing isolation of the user space from the kernel space. In addition, because the kernel-mode EPT maps, to an invalid page-table page, some page-table pages in the GPT that are used to translate a user-mode GVA, during execution, a kernel program is not cheated by malicious software to directly redirect to execute user space code, thereby enhancing isolation of the user space from the kernel space.

For example, if content stored in the kernel space is less important, the VMM may allow some APPs (for example, some APPs that succeed in security authentication for a plurality of times) running in the VM to access the content, that is, the VMM maps, to an invalid page-table page using the user-mode EPT, some page-table pages in the GPT that are used to translate a kernel-mode GVA.

For another example, if content stored in the kernel space is more important, the VMM may prohibit all APPs running in the VM from accessing all content in the kernel space, that is, the VMM maps, to an invalid page-table page using the user-mode EPT, all page-table pages in the GPT that are used to translate a kernel-mode GVA.

For still another example, the VMM may prohibit kernel-mode code running in the VM from accessing user code, that is, the VMM maps, to an invalid page-table page using the kernel-mode EPT, some page-table pages in the GPT that are used to translate a code segment GVA of a user application.

In addition, only the EPT needs to be switched in the solution, and a rate of switching the EPT is higher than that of switching the GPT. In addition, a TLB does not need to be emptied to switch the EPT. Therefore, compared with a solution of enhancing isolation of the user space from the kernel space by switching the GPT, the solution provided in this application reduces impact on application performance while avoiding content leakage of the kernel space.

Optionally, the invalid page-table page is a host physical page whose content is all 0, or a host physical page whose content is other data that can prevent the guest virtual address from being successfully translated, for example, a host physical page whose content is all 255.

Figure 5:
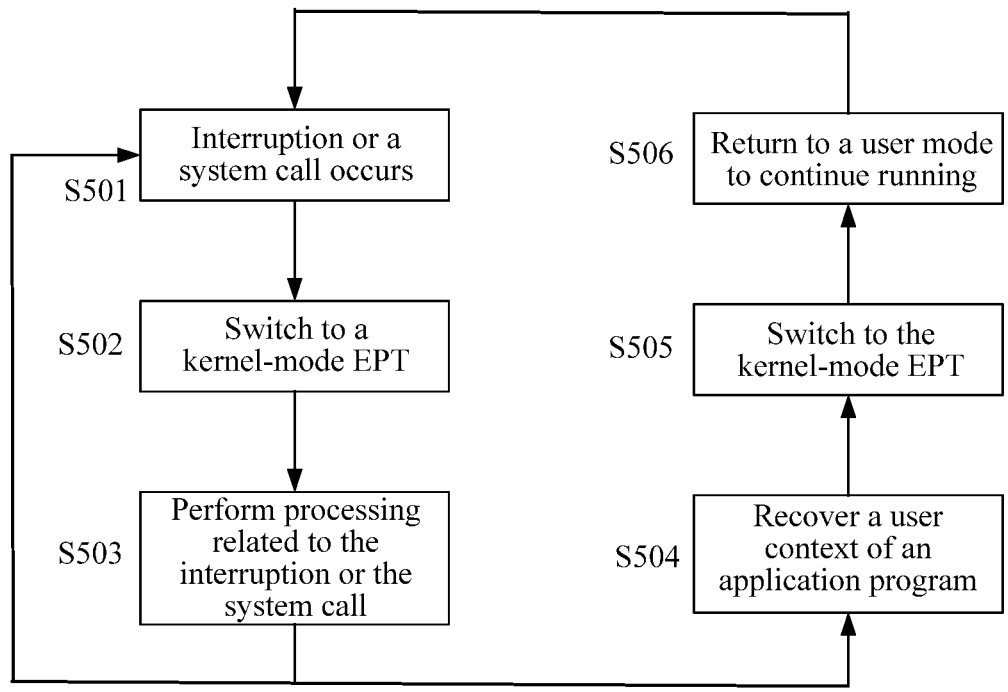
FIG. 5 is a schematic flowchart of switching between a kernel mode and a user mode of a virtual machine according to this application.

FIG. 5 is a schematic flowchart of switching between a kernel mode and a user mode of a VM according to this application.

As shown in FIG. 5, the switching procedure includes:

S501: When interruption or a system call occurs, a CPU determines an entry location of a corresponding processing function (a function related to the interruption or the system call) based on some particular registers, and performs redirection. In this application, all processing function entries of interruption and a system call are set to extended page table switching code.

S502: The extended page table switching code calls an EPT switching instruction, switches a user-mode EPT used by a VM to a kernel-mode EPT, and subsequently redirects to an interruption or system call processing function in a VM kernel.

S503: A guest OS normally processes the interruption or the system call, and if interruption occurs again at this time, it indicates that a priority of current interruption is higher than that of previous interruption, and redirection to S501 is performed.

S504: The guest OS normally returns to a user program, and recovers register content of the user program (that is, recovers a context of the application program).

S505: The CPU redirects to an extended page table switching module to switch to the user-mode EPT.

S506: The CPU executes a user-mode returning instruction to enter the user mode to continue running.

Because a page-table page in the GPT that is used to translate a kernel-mode GVA changes, the VMM 120 may dynamically capture, using a guest page table tracing module 122, the page-table page in the GPT that is used to translate the kernel-mode GVA, and modify the user-mode EPT using the extended page table creation module 121, to prevent an old user-mode EPT to map the page-table page to a corresponding host physical page.

Therefore, before S110, the VMM 120 further needs to perform: determining a page-table page in the GPT that is used to translate a kernel-mode GVA.

Figure 6:
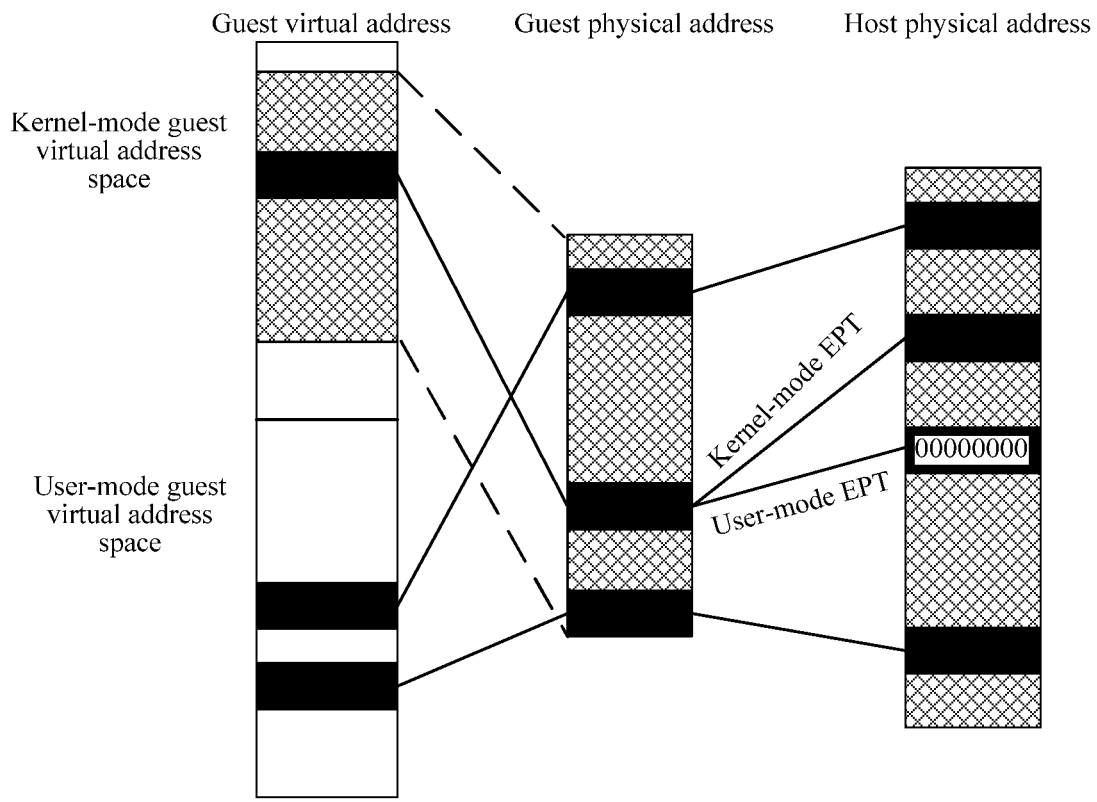
FIG. 6 is a schematic diagram of a method for controlling content of a guest page table using an extended page table according to this application.

FIG. 6 is a schematic diagram of controlling a GPT using an EPT according to this application.

In FIG. 6, a guest virtual address includes a kernel-mode guest virtual address and a user-mode guest virtual address, and a dividing line therebetween is shown by a dashed line in the figure. A grid padding area (including a black padding area) indicates virtual address space and mapping thereof, a black padding area indicates a virtual address page and mapping thereof, and a solid line between the black padding areas indicates a mapping relationship between two pages. The dashed line in FIG. 6 indicates a mapped address range of a guest page table.

Each page-table page in the GPT is mapped to a host physical page using an EPT. The EPT can control mapping from a guest physical page to a host physical page. The extended page table creation module 121 creates two page tables: a kernel-mode EPT and a user-mode EPT. In the kernel-mode EPT, mapping of a guest page-table page remains unchanged; and in the user-mode EPT, some guest physical pages are mapped to a new host physical page (for example, a host physical page whose content is all 0 shown in FIG. 6). The extended page table creation module 121 can control content in the GPT by controlling content in the new host physical page, to prevent the page-table page in the GPT that is used to translate a kernel-mode GVA from being mapped to a corresponding host physical page.

Optionally, the GPT includes a fourth-level page-table page and a third-level page-table page, the determining, by the VMM 120, a page-table page in the GPT that is used to translate a kernel-mode GVA includes: determining (that is, tracing), by the VMM 120, a third-level page-table page in the GPT that is used to translate a kernel-mode GVA.

Because a GVA range managed by a fourth-level page-table page is excessively large, a page-table page used to translate a kernel-mode GVA and a page-table page used to translate a user-mode GVA cannot be distinguished at a level of the fourth-level page table. In addition, because a quantity of third-level page-table pages is less than a quantity of second-level page-table pages and a quantity of first-level page-table pages, the solution can reduce costs of tracing a guest page-table page while tracing, in real time, the page-table page in the GPT that is used to translate the kernel-mode GVA.

Figure 7:
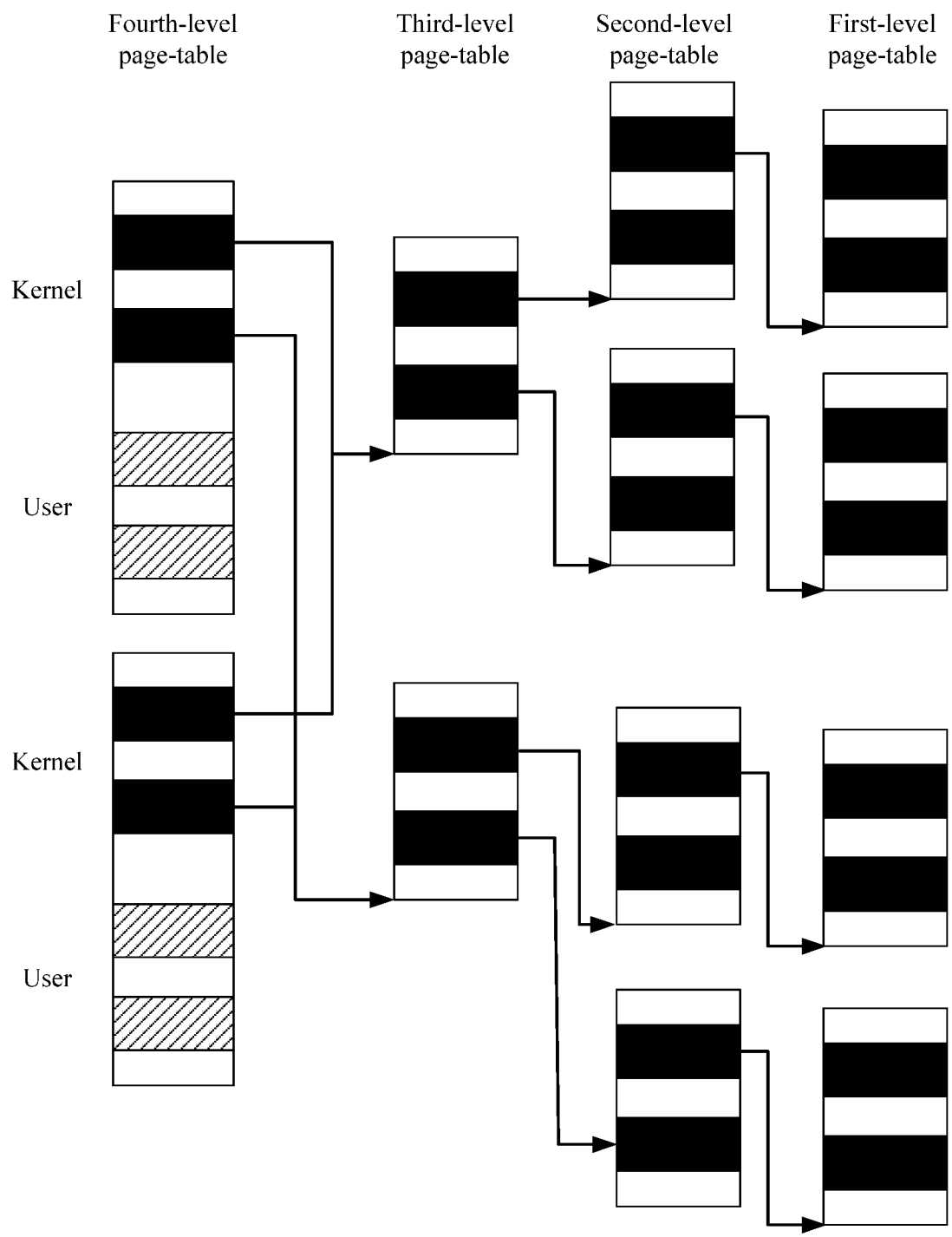
FIG. 7 is a schematic structural diagram of a guest page table according to this application.

FIG. 7 is a schematic structural diagram of a GPT according to this application.

In FIG. 7, black padding indicates a kernel page table entry, that is, a page table entry for mapping a kernel-mode virtual address. Slash padding indicates a user page table entry, that is, a page table entry for mapping a user-mode virtual address. An arrow indicates a virtual address translation process.

A GVA requires four levels of page table translation to finally find a corresponding GPA from a first-level page table. In addition, kernel space and user space separately use independent 128 TB virtual address space in Linux, and for different user processes, address space mapping of the kernel space is all the same. To be more specific, in page tables of different user processes, first-level, second-level, and third-level page-table pages used for the kernel space are all the same. Based on this characteristic, the extended page table creation module 121 may modify a user-mode EPT to map, to a new host physical page, a third-level page-table page in the GPT that is used to translate a kernel-mode virtual address, and set content of the new host physical page to 0.

When a CPU runs in a user mode (that is, a VM is in the user mode), a GVA is translated using the user-mode EPT. When a kernel-mode GVA is translated, it is found that content of a guest page-table page used to translate the kernel-mode GVA is 0, resulting in a translation failure. Therefore, this effectively prevents a malicious application from stealing kernel data using a meltdown vulnerability.

A method for tracing a third-level page-table page is capturing all operations of modifying a page table base address in the VM, such that the VM is trapped into the VMM. The VMM marks all fourth-level page-table pages as read-only, such that the VM is trapped into the VMM each time modifying the fourth-level page-table page, and the guest page table tracing module 122 can find, in real time, all third-level page-table pages used to translate a kernel-mode GVA.

For example, before determining a page-table page in the GPT that is used to translate a kernel-mode GVA, the VMM 120 first obtains base address modification information, where the base address modification information is used to indicate a storage location of the GPT; and obtains the GPT based on the base address modification information.

The base address modification information is a value of a register storing a page table base address in a CPU. On an Intel platform, a register storing a page table base address is a CR 3, when a virtual machine switches, a value of the CR 3 changes, and the VMM 120 obtains base address modification information by reading the value of the CR 3.

The solution enables the VMM to obtain a currently used GPT by obtaining the base address modification information, to trace a page-table page that is in the GPT currently used by the VM and that is used to translate a kernel-mode GVA.

However, the method results in massive unnecessary exit of the virtual machine, affecting performance of the VM. Based on a feature of a Linux operating system, this application provides an efficient method for tracing a third-level page-table page.

In the Linux operating system, lengths of most kernel virtual address segments remain unchanged (for example, a code segment and a direct mapping segment). In addition, some changeable virtual address segments linearly increase. To be more specific, only after all entries in a third-level page-table page are used, a new third-level page-table page is applied for. Based on this characteristic, the guest page table tracing module 122 first finds, after the VM is started, all third-level page-table pages used to translate a kernel-mode GVA, and sets all the third-level page-table pages to the VM being only capable of reading. When a third-level page-table page is fully filled, a guest OS applies for a new third-level page-table page, and the VMM sets all fourth-level page-table pages to the VM being only capable of reading, to capture the applied new third-level page-table page. Because there is a very small quantity of times a third-level page-table page is modified or newly created after the Linux operating system is started, the method can alleviate massive exit of the virtual machine.

In addition, the solution can determine, using the modified fourth-level page-table page, the third-level page-table page newly added to the GPT to translate a kernel-mode GVA. This avoids that the third-level page-table page newly added to the GPT to translate a kernel-mode GVA is omitted and consequently an application accesses kernel content using the third-level page-table page, thereby enhancing isolation of the user space from the kernel space, reducing a quantity of times the VM exits, and improving performance of the virtual machine.

Steps of the solution are as follows.

The determining, by the VMM 120, a third-level page-table page in the GPT that is used to translate a kernel-mode GVA includes: setting, by the VMM 120, a read-write attribute of the third-level page-table page in the GPT that is used to translate a kernel-mode GVA to the VM being only capable of reading, where the virtual machine is triggered to exit (VM exit) when the page-table page that the VM is only capable of reading in the GPT is modified by the VM.

When the virtual machine is triggered to exit, the VMM 120 determines whether the third-level page-table page in the GPT that is used to translate a kernel-mode GVA is fully filled.

When the third-level page-table page in the GPT that is used to translate a kernel-mode GVA is fully filled, the VMM 120 sets read-write attributes of all fourth-level page-table pages in the GPT to the virtual machine being only capable of reading.

The VMM 120 performs a virtual machine entry (VM entry) operation. Compared with virtual machine exit, this means that a virtual machine starts to work.

When the virtual machine is triggered to exit again, the VMM 120 determines whether the fourth-level page-table page is modified.

When the fourth-level page-table page is modified, the VMM 120 determines, based on the modified fourth-level page-table page, a third-level page-table page newly added to the GPT to translate a kernel-mode GVA.

Figure 8:
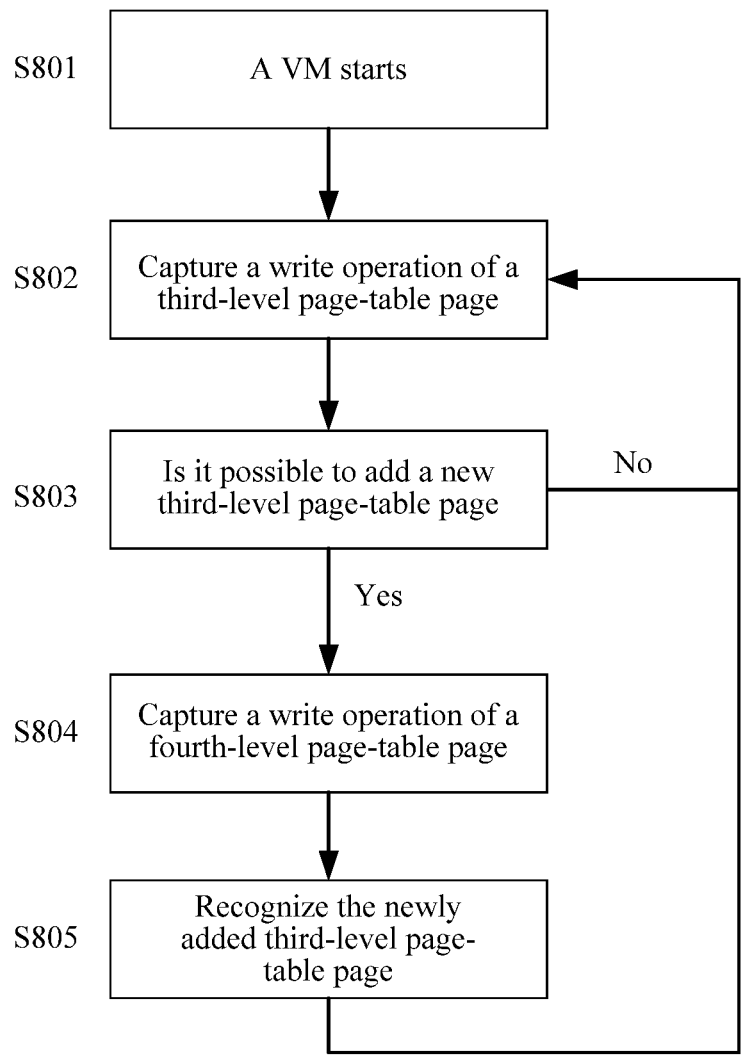
FIG. 8 is a schematic flowchart of tracing a third-level page-table page according to this application.

FIG. 8 is a schematic flowchart of tracing a third-level page-table page according to this application. The tracing procedure includes the following.

S801: When a VM starts, a VMM captures a guest page table used by the VM, and recognizes all third-level page-table pages used to translate a kernel-mode GVA. Subsequently, these third-level page-table pages are set to the VM being only capable of reading.

S802: When a guest OS modifies a third-level page-table page corresponding to a kernel virtual address, trap the guest OS into a guest page table tracing module of the VMM.

S803: If a current write operation object is not the last entry of the third-level page-table page, the VMM determines that no new third-level page-table page appears, the guest page table tracing module completes a write operation, and return to S802. If the current write operation object is the last entry of the third-level page-table page, the VMM determines that a new third-level page-table page is to be added subsequently.

S804: Start write protection of all fourth-level page-table pages and start to capture a write operation of the fourth-level page-table page.

S805: If a third-level page-table page used to translate a kernel-mode GVA is newly added to a write operation of the fourth-level page-table page, add the page to a tracing list, and perform S802.

Each time using a page-table page in the GPT to translate a GVA, a CPU adds a particular access bit to the used page-table page. Therefore, all memory access operations of the VM modify the page-table page in this mechanism, and if a read-write attribute of the page-table page is the VM being only capable of reading, massive exit of the virtual machine is triggered, affecting VM performance.

To resolve this problem, this application provides a GPT write protection method to avoid massive exit of the virtual machine while capturing a GPT modification made by the VM.

Figure 9:
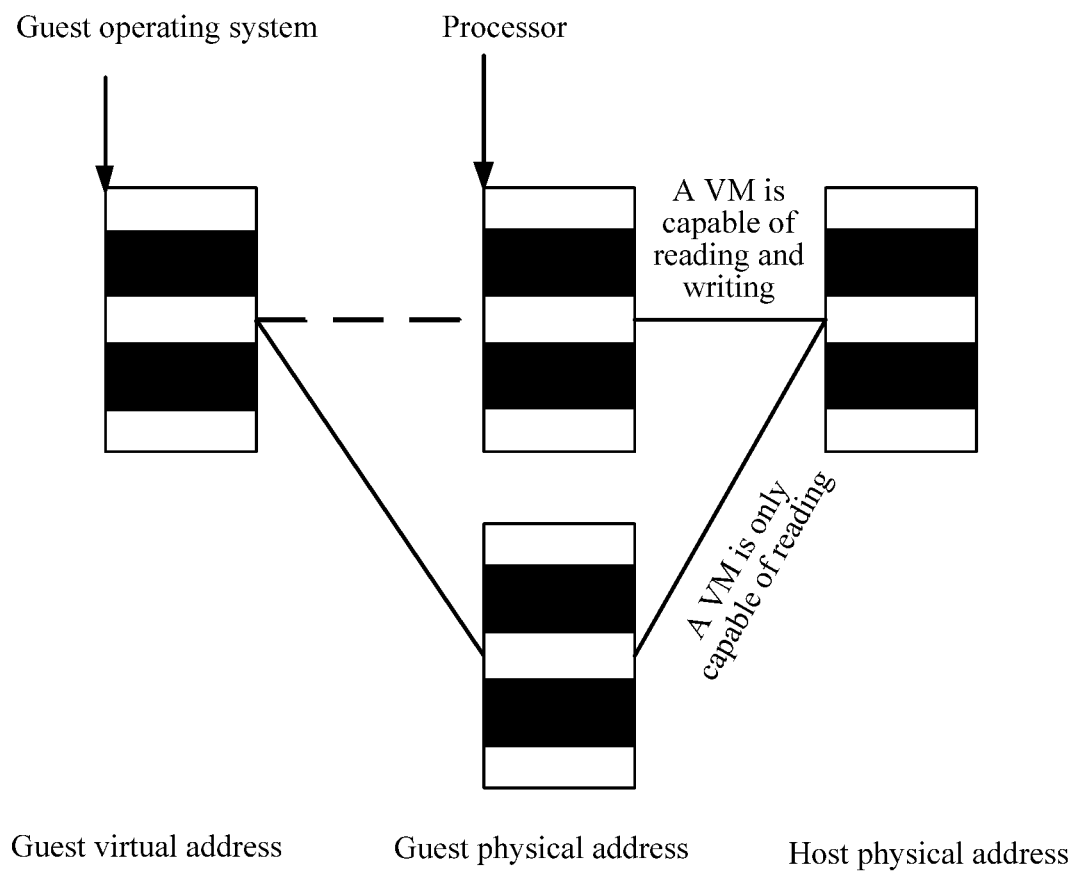
FIG. 9 is a schematic diagram of a write protection method of a guest page table according to this application.

As shown in FIG. 9, a black padding rectangle and a white padding rectangle both indicate a page-table page, an arrow indicates that a guest operating system or a processor reads a corresponding page-table page, a solid line indicates a mapping relationship between different addresses, and a dashed line indicates a mapping relationship between a created new guest virtual address and a guest physical address used by the processor.

The guest OS accesses a GPT using a GVA. When a VM runs, the processor runs in a non-root mode and accesses a page table using a GPA. The guest page table tracing module 122 maps, in two EPTs (that is, a kernel-mode EPT and a user-mode EPT), the GPA to the VM being capable of reading and writing, to allow the processor to update an access bit in the GPT. The guest page table tracing module 122 modifies content of the GPT, maps a GVA corresponding to the GPT to a new GPA, and subsequently maps, in the kernel-mode EPT, the new GPA to the VM being only capable of reading. Because two different GPAs are mapped to a same HPA, the GPAs correspond to consistent content. However, because of permission control, the virtual machine is triggered to exit when the guest OS accesses the GPT.

For example, the VMM 120 maps a third-level page-table page and a fourth-level page-table page whose read-write attributes are the virtual machine being only capable of reading in the GPT to a first GPA. The first GPA and a second GPA are different from each other. A read-write attribute of the first GPA in the kernel-mode extended page table is the virtual machine being only capable of reading, and a read-write attribute of the second GPA in the user-mode extended page table and the kernel-mode extended page table is the virtual machine being capable of reading and writing. The first GPA is a guest physical address used by the virtual machine, the second GPA is a guest physical address used by the processor, and the first GPA and the second GPA are mapped to a same HPA.

In this application, terms such as "first" and "second" are only used to distinguish different nouns and indicate no limitation on nouns modified by the terms. The foregoing sets no limitation on the first GPA, and therefore the first GPA may be any GPA, and the second GPA may be any GPA different from the first GPA.

While tracing a page-table page in the GPT that is used to translate a kernel-mode GVA, the solution can avoid that the processor translates an address using a guest page-table page and consequently the virtual machine is triggered to exit.

The foregoing describes the solution of enhancing isolation of the user space from the kernel space in a virtualized system including a user-mode EPT and a kernel-mode EPT. However, some virtualized systems including no user-mode EPT and no kernel-mode EPT require upgrade to create a user-mode EPT and a kernel-mode EPT. A dynamic image modification module 123 may upgrade a virtualized system including no user-mode EPT and no kernel-mode EPT.

In an optional example, before S110, the method 100 further includes: migrating, by the VMM 120, a VM 1 from a first host (for example, a hardware layer 110) to a second host using a virtual machine hot migration technology; writing, by the VMM 120, first switching code at a virtual machine kernel-mode entry of the first host; and writing second switching code at a virtual machine kernel-mode exit of the first host, where the first switching code is used to switch the user-mode EPT to the kernel-mode EPT, and the second switching code is used to switch the kernel-mode EPT to the user-mode EPT.

These steps may be performed by the dynamic image modification module 123.

After S120, the method 100 further includes: migrating, by the VMM 120, the virtual machine from the second host to the first host using the virtual machine hot migration technology.

The VMM 120 completes hot migration processing of the VM 1 by cooperating with a VMM of the second host using the virtual machine hot migration technology.

In the method for accessing a host physical address, isolation of the user space from the kernel space is enhanced by switching an EPT, and the GPT does not need to be processed. Therefore, a VM service does not need to be interrupted. A running VM may be migrated to a normally running host (that is, the second host) using the virtual machine hot migration technology, an EPT and a kernel-mode exit and a kernel-mode entry of the virtual machine are subsequently processed on the first host, and the VM is migrated back to the first host after processing is completed, to enhance VM security without interrupting a service.

An optional example of processing the kernel-mode exit and the kernel-mode entry of the virtual machine by the dynamic image modification module 123 on the first host is as follows.

The dynamic image modification module 123 modifies the guest operating system in real time, and inserts an extended page table switching instruction when entering a kernel mode and exiting from the kernel mode. An available extended page table switching instruction is VMFUNC. The instruction provides an EPT switching capability and can switch an EPT configured by the VMM. An entire switching process is completed within a VM, and no virtual machine needs to be triggered to exit. The dynamic image modification module 123 first recognizes all locations for entering and exiting from a VM kernel mode and subsequently inserts an extended page table switching instruction.

VM kernel-mode entry recognition: The dynamic image modification module 123 positions, based on a system structure feature, an entry for entering the kernel mode. On an X86 platform, only interruption and a system call generate migration from a user mode to the kernel mode, and a corresponding kernel-mode entry is recorded in a particular hardware register. The dynamic image modification module 123 captures a modification of the register to find all kernel-mode entries.

VM kernel-mode exit recognition: Because the user mode can be returned to from the kernel mode only using some particular assembly instructions (for example, sysret), the dynamic image modification module 123 can position all kernel-mode exit locations by scanning VM kernel code.

EPT switching code embedding: EPT switching code is the first switching code and the second switching code. The dynamic image modification module 123 first maps EPT switching code to a VM. For example, the dynamic image modification module 123 maps, by modifying the GPT, a kernel-mode virtual page segment to a guest physical page, and subsequently maps the guest physical page to a host physical page on which EPT switching code is written.

At the kernel-mode entry, the dynamic image modification module 123 first modifies different processing function entries of interruption and a system call that are stored in a hardware register, points the processing function entries to EPT switching code mapped in advance, and redirects to an original processing function for execution after completing page table switching.

At the kernel-mode exit, the dynamic image modification module 123 rewrites an original kernel-mode exit instruction to a redirection instruction, redirects to EPT switching code, and executes the exit instruction to return to the user mode after switching the kernel-mode EPT to the user-mode EPT.

Optionally, the first switching code and the second switching code are used to call an EPT switching function of the processor of the first host.

The EPT switching function of the processor that is used by the processor of the first host may be a function provided by a hardware circuit or a function provided by CPU microcode, and this is not limited in this application. The EPT switching function of the processor is called to prevent triggering a virtual machine to exit, thereby improving VM performance.

Figure 10:
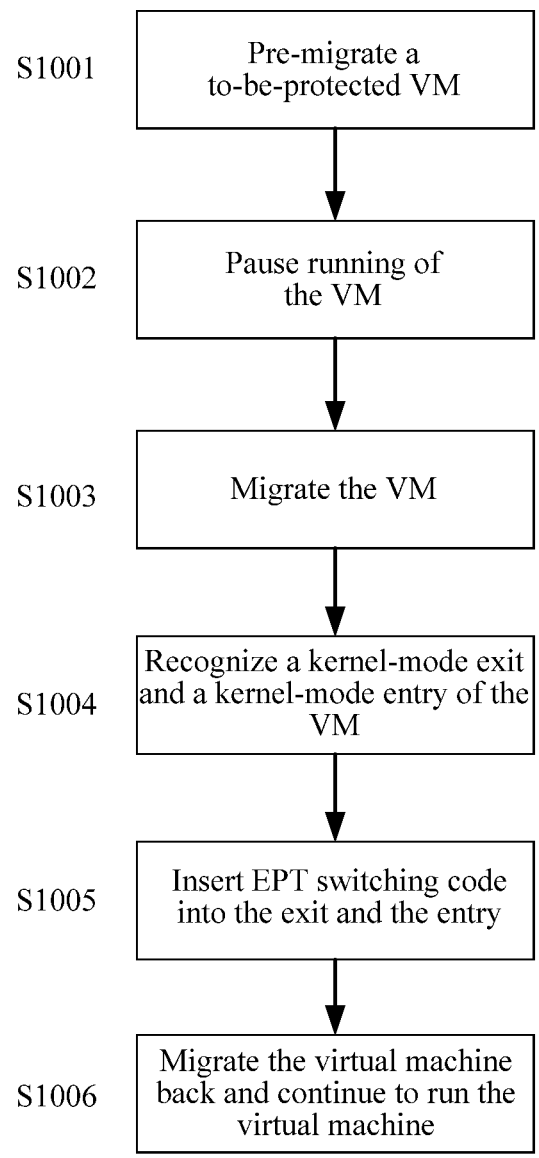
FIG. 10 is a schematic flowchart of upgrading a virtual machine monitor during working of a virtual machine to enhance isolation of user space from kernel space according to this application.

FIG. 10 is a schematic flowchart of upgrading a VMM during working of a VM to enhance isolation of user space from kernel space according to this application. The procedure includes the following.

S1001: A to-be-protected VM starts to run on a VMM not using the method 100, and therefore needs to be migrated to another VMM. An existing hot migration technology may be used herein, a pre-migration operation is first performed, and a virtual machine status is copied. In this case, the VM still runs.

S1002: Pause the VM and copy remaining little status information.

S1003: Migrate the VM to another VMM.

S1004: A guest image modification module recognizes a kernel-mode exit and a kernel-mode entry of the VM.

S1005: The guest image modification module inserts EPT switching code into the VM.

S1006: Migrate the virtual machine back and continue to run the virtual machine.

The extended page table creation module 121, the guest page table tracing module 122, and the dynamic image modification module 123 can ensure that when the VM enters or exits from a kernel mode, a corresponding EPT is switched, to prevent user-mode code run by the VM from stealing kernel data using a meltdown vulnerability. However, because an EPT switching instruction can be executed on a user-mode VM, an attacker may first switch to a kernel-mode EPT using the EPT switching instruction and then perform an attack.

To resist this type of attack, the VMM may prevent, using a malicious page table switching defense module 124, an operation of switching to a kernel extended page table in a user mode. For example, the malicious page table switching defense module 124 controls the kernel-mode EPT, and marks all non-kernel code segments as non-executable. Once the user-mode code requests to switch a kernel extended page table, the user-mode code cannot be executed. In the kernel-mode EPT, only kernel code and kernel module code have executable permission. The former is loaded to a particular GVA when the VM is started, and the latter may be dynamically loaded to a particular GVA or may be dynamically removed.

In an optional example, the malicious page table switching defense module 124 first marks all guest physical memories as non-executable in the kernel-mode EPT. When the VM is started, a GPA of kernel code is recognized and is marked as executable. For a kernel module, the malicious page table switching defense module 124 first traces write operations of guest page-table pages corresponding to all kernel modules in real time using the guest page table tracing module 122. Once a loaded new kernel module is found, a guest physical address of the kernel module is marked as executable, and a guest physical address originally occupied by a deleted kernel module is marked as non-executable.

The example of the method for enhancing isolation of user space from kernel space provided in this application is described above in detail. It may be understood that to perform the foregoing functions, an apparatus for enhancing isolation of user space from kernel space includes corresponding hardware structures and/or software modules for performing the functions. A person skilled in the art should be aware that units and algorithm steps in the examples described with reference to the embodiments disclosed in this specification may be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, functional units of the apparatus for enhancing isolation of user space from kernel space may be divided based on the foregoing method example. For example, the functions may be divided into functional units, or two or more functions may be integrated in one processing unit. The foregoing integrated unit may be implemented in a form of hardware, or may be implemented in a form of a software functional unit. It should be noted that, in this application, unit division is an example, and is merely a logical function division. In actual implementation, another division manner may be used.

Figure 11:
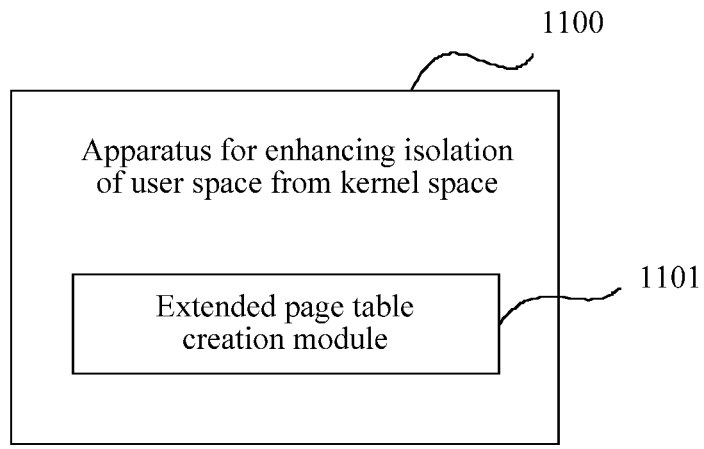
FIG. 11 is a schematic structural diagram of an apparatus for enhancing isolation of user space from kernel space according to this application.

When an integrated unit is used, FIG. 11 is a possible schematic structural diagram of an apparatus for enhancing isolation of user space from kernel space in the foregoing embodiment. The apparatus 1100 includes an extended page table creation module 1101. Optionally, the apparatus 1100 may further include one or more of a dynamic image modification module, a guest page table tracing module, and a malicious page table switching defense module. The extended page table creation module 1101 is used by the apparatus 1100 to perform the steps of EPT creation and mapping processing shown in FIG. 4. The extended page table creation module 1101 may be further configured to perform another process of the technology described in this specification. The apparatus 1100 may further include a storage unit configured to store program code and data of the apparatus 1100.

For example, the extended page table creation module 1101 is configured to: create at least two extended page tables, where the at least two extended page tables include a user-mode extended page table and a kernel-mode extended page table, the user-mode extended page table is used to be called, when a virtual machine executes user-mode code, by a processor running the virtual machine, and the kernel-mode extended page table is used to be called, when the virtual machine executes kernel-mode code, by the processor running the virtual machine; and perform mapping processing on the user-mode extended page table and/or the kernel-mode extended page table, where some or all page-table pages in a guest page table that are used to translate a kernel-mode guest virtual address are mapped to an invalid page-table page using the user-mode extended page table, and/or some page-table pages in the guest page table that are used to translate a user-mode guest virtual address are mapped to an invalid page-table page using the kernel-mode extended page table.

The extended page table creation module 1101 may be a component of a processing unit. The processing unit may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The obtaining unit 1101 may be a transceiver or a communications interface. The storage unit may be a memory.

Figure 12:
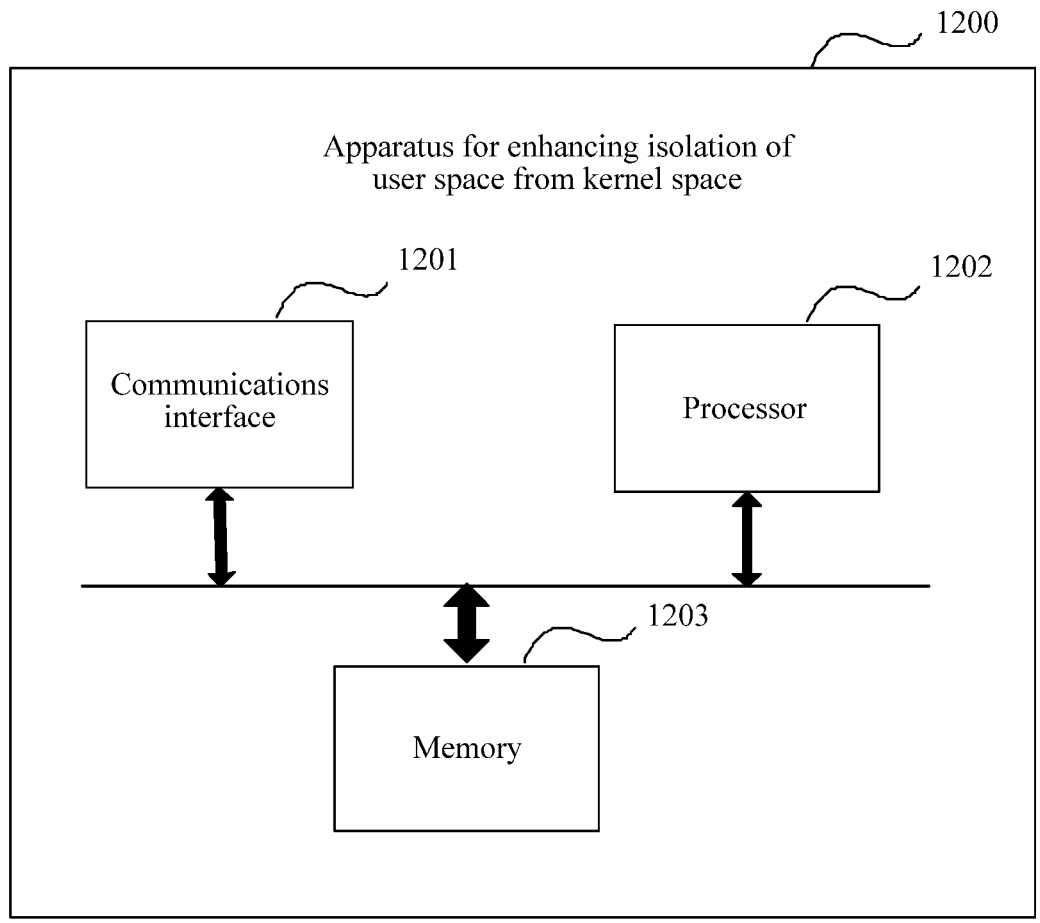
FIG. 12 is a schematic structural diagram of another apparatus for enhancing isolation of user space from kernel space according to this application.

When the processing unit is a processor and the storage unit is a memory, the apparatus for enhancing isolation of user space from kernel space in this application may be an apparatus shown in FIG. 12.

Referring to FIG. 12, the apparatus 1200 includes: a processor 1202, a communications interface 1201 (optional), and a memory 1203. The communications interface 1201, the processor 1202, and the memory 1203 may communicate with each other and transfer a control and/or data signal using an internal connection path. Implementation code of a virtual machine monitor and a virtual machine is stored in the memory 1203.

It may be understood by a person skilled in the art that, for ease and brief description, for a detailed working process of the foregoing apparatus and units, refer to a corresponding process in the foregoing method embodiments, and details are not described herein again.

The apparatus for enhancing isolation of user space from kernel space provided in this application divides an extended page table into a kernel-mode extended page table and a user-mode extended page table, such that user-mode code cannot access some or all content in the kernel space, and/or kernel-mode code cannot access some content in the user space, thereby enhancing isolation of the user space from the kernel space and preventing content leakage of the kernel space.

The apparatus embodiment completely corresponds to the method embodiment, and a corresponding module performs a corresponding step. For example, the obtaining unit executes the obtaining step in the method embodiment, and other steps than the obtaining step may be performed by the processing unit or the processor. For a function of a specific unit, refer to the corresponding method embodiment, and details are not described again.

It should be understood that sequence numbers of the foregoing processes do not mean execution sequences in various embodiments of this application. The execution sequences of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Method or algorithm steps described in combination with the content disclosed in this application may be implemented by hardware, or may be implemented by a processor by executing a software instruction. The software instruction may include a corresponding software module. The software module may be stored in a random-access memory (RAM), a flash memory, a read-only memory (ROM), an erasable programmable ROM (EPROM), an electrically EPROM (EEPROM), a register, a hard disk, a removable hard disk, a compact disc read-only memory (CD-ROM), or any other form of storage medium well-known in the art. For example, a storage medium is coupled to a processor, such that the processor can read information from the storage medium or write information into the storage medium. Certainly, the storage medium may be a component of the processor. The processor and the storage medium may be located in the ASIC.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or other programmable apparatuses. The computer instruction may be stored in a computer readable storage medium, or may be transmitted using the computer readable storage medium. The computer instruction may be transmitted from a website, computer, server, or data center to another website, computer, server, or data center in a wired (for example, using a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state disk (SSD)), or the like.

The objectives, technical solutions, and beneficial effects of this application are further described in detail in the foregoing embodiments. It should be understood that the foregoing descriptions are merely example embodiments of this application, but are not intended to limit the protection scope of this application. Any modification, equivalent replacement or improvement made based on the technical solutions of this application shall fall within the protection scope of this application.

What is claimed is:

1. A method for enhancing isolation of user space from kernel space in a virtualized system comprising a virtual machine and a virtual machine monitor, the method comprising:
   creating, by the virtual machine monitor, extended page tables comprising at least a user-mode extended page table and a kernel-mode extended page table, wherein the user-mode extended page table is to be called when the virtual machine executes user-mode code by a processor running the virtual machine, and wherein the kernel-mode extended page table is to be called when the virtual machine executes kernel-mode code by the processor running the virtual machine; and
   performing, by the virtual machine monitor, mapping processing on the user-mode extended page table or the kernel-mode extended page table,
   wherein performing the mapping processing on the user-mode extended page table comprises mapping first page-table pages in a guest page table that are for translating a kernel-mode guest virtual address to an invalid page-table page using the user-mode extended page table, and
   wherein performing the mapping processing on the kernel-mode extended page table comprises mapping second page-table pages in the guest page table that are for translating a user-mode guest virtual address to the invalid page-table page using the kernel-mode extended page table.

2. The method according to claim 1, wherein the invalid page-table page is a host physical page whose content is all 0s.

3. The method according to claim 1, wherein before creating the extended page tables, the method further comprises determining, by the virtual machine monitor, that the first page-table pages are for translating the kernel-mode guest virtual address.

4. The method according to claim 3, wherein the guest page table comprises a fourth-level page-table page and a third-level page-table page, and wherein determining the first page-table pages in the guest page table comprises determining, by the virtual machine monitor, that the third-level page-table page in the guest page table is for translating the kernel-mode guest virtual address.

5. The method according to claim 4, wherein determining the third-level page-table page in the guest page table comprises:
   setting, by the virtual machine monitor, a third read-write attribute of the third-level page-table page such that the virtual machine is only capable of reading, wherein the third-level page-table page in the guest page table that the virtual machine is only capable of reading is for triggering the virtual machine to exit when being modified by the virtual machine;
   determining, by the virtual machine monitor when the virtual machine is triggered to exit, whether the third-level page-table page is fully filled;
   setting, by the virtual machine monitor when the third-level page-table page is fully filled, read-write attributes of all fourth-level page-table pages in the guest page table such that the virtual machine is only capable of reading;
   performing, by the virtual machine monitor, an entering operation of the virtual machine;
   determining, by the virtual machine monitor when the virtual machine is triggered to exit again, whether a fourth-level page-table page is modified; and
   determining, by the virtual machine monitor when the fourth-level page-table page is modified, a newly added third-level page-table page in the guest page table that is for translating the kernel-mode guest virtual address.

6. The method according to claim 5, further comprising mapping, by the virtual machine monitor, the third-level page-table page and the fourth-level page-table page whose read-write attributes are the virtual machine being only capable of reading in the guest page table to a first guest physical address, wherein the first guest physical address and a second guest physical address are different from each other, wherein a first read-write attribute of the first guest physical address in the kernel-mode extended page table is the virtual machine being only capable of reading, wherein a second read-write attribute of the second guest physical address in the user- mode extended page table and the kernel-mode extended page table is the virtual machine being capable of reading and writing, wherein the first guest physical address is used by the virtual machine, wherein the second guest physical address is used by the processor, and wherein the first guest physical address and the second guest physical address are mapped to a same host physical address.

7. The method according to claim 3, wherein before determining the first page-table pages in the guest page table, the method further comprises:
   obtaining, by the virtual machine monitor, base address modification information, wherein the base address modification information indicates a storage location of the guest page table; and
   obtaining, by the virtual machine monitor, the guest page table based on the base address modification information.

8. The method according to claim 1, wherein the virtual machine monitor is on a first host, wherein before creating the extended page tables, the method further comprises:
   migrating, by the virtual machine monitor, the virtual machine from the first host to a second host using a virtual machine hot migration technology;
   writing, by the virtual machine monitor, a first switching code at a virtual machine kernel-mode entry of the first host; and
   writing a second switching code at a virtual machine kernel-mode exit of the first host, wherein the first switching code is for switching the user-mode extended page table to the kernel-mode extended page table, and wherein the second switching code is for switching the kernel-mode extended page table to the user-mode extended page table, and
   wherein after performing the mapping processing on the user-mode extended page table or the kernel-mode extended page table, the method further comprises migrating, by the virtual machine monitor, the virtual machine from the second host to the first host using the virtual machine hot migration technology.

9. The method according to claim 8, wherein the first switching code and the second switching code are for calling an extended page table switching function of a processor of the first host.

10. An apparatus for enhancing isolation of user space from kernel space in a virtualized system comprising a virtual machine and a virtual machine monitor, wherein the apparatus comprises:
  an extended page table creator configured to:
    create extended page tables comprising at least a user-mode extended page table and a kernel-mode extended page table, wherein the user-mode extended page table is to be called when the virtual machine executes user-mode code by a processor running the virtual machine, and wherein the kernel-mode extended page table is to be called when the virtual machine executes kernel-mode code by the processor running the virtual machine; and
    perform mapping processing on the user-mode extended page table or the kernel- mode extended page table,
  wherein performing mapping processing on the user-mode extended page table comprises mapping first page-table pages in a guest page table that are for translating a kernel-mode guest virtual address to an invalid page-table page using the user-mode extended page table, and
  wherein performing mapping processing on the kernel-mode extended page table comprises mapping second page-table pages in the guest page table that are for translating a user-mode guest virtual address to the invalid page-table page using the kernel-mode extended page table.

11. The apparatus according to claim 10, wherein the invalid page-table page is a host physical page whose content is all 0.

12. The apparatus according to claim 10, further comprising a guest page table tracer configured to determine the first page-table pages in the guest page table that are used to translate the kernel-mode guest virtual address.

13. The apparatus according to claim 12, wherein the guest page table comprises a fourth-level page-table page and a third-level page-table page, and wherein the guest page table tracer is configured to determine that the third-level page-table page in the guest page table is for translating the kernel-mode guest virtual address.

14. The apparatus according to claim 13, wherein the guest page table tracer is further configured to:
  set a third read-write attribute of the third-level page-table page in the guest page table such the virtual machine is only capable of reading, wherein the third-level page-table page in the guest page table that the virtual machine is only capable of reading is used to trigger the virtual machine to exit when being modified by the virtual machine;
  determine, when the virtual machine is triggered to exit, whether the third-level page-table page in the guest page table is fully filled;
  set, when the third-level page-table page in the guest page table is fully filled, read-write attributes of all fourth-level page-table pages in the guest page table such that the virtual machine is only capable of reading;
  perform an entering operation of the virtual machine;
  determine, when the virtual machine is triggered to exit again, whether a fourth-level page-table page is modified; and
  determine, when the fourth-level page-table page is modified, a newly added third-level page-table page in the guest page table that is for translating the kernel-mode guest virtual address.

15. The apparatus according to claim 14, wherein the guest page table tracer is further configured to map the third-level page-table page and the fourth-level page-table page whose read-write attributes are the virtual machine being only capable of reading in the guest page table to a first guest physical address, wherein the first guest physical address and a second guest physical address are different from each other, wherein a first read-write attribute of the first guest physical address in the kernel-mode extended page table is the virtual machine being only capable of reading, wherein a second read-write attribute of the second guest physical address in the user-mode extended page table and the kernel-mode extended page table is the virtual machine being capable of reading and writing, wherein the first guest physical address is used by the virtual machine, wherein the second guest physical address is used by the processor, and wherein the first guest physical address and the second guest physical address are mapped to a same host physical address.

16. The apparatus according to claim 12, wherein the guest page table tracer is further configured to:
  obtain base address modification information, wherein the base address modification information indicates a storage location of the guest page table; and
  obtain the guest page table based on the base address modification information.

17. The apparatus according to claim 10, wherein the virtual machine monitor is on a first host, and wherein the apparatus further comprises a hot migration tool and a dynamic image modification tool, wherein the hot migration tool is configured to migrate the virtual machine from the first host to a second host using a virtual machine hot migration technology, wherein the dynamic image modification tool is configured to write a first switching code at a virtual machine kernel-mode entry of the first host and write a second switching code at a virtual machine kernel-mode exit of the first host, wherein the first switching code is for switching the user-mode extended page table to the kernel-mode extended page table, wherein the second switching code is for switching the kernel-mode extended page table to the user-mode extended page table, and wherein the hot migration tool is further configured to migrate the virtual machine from the second host to the first host using the virtual machine hot migration technology.

18. The apparatus according to claim 17, wherein the first switching code and the second switching code are for calling an extended page table switching function of a processor of the first host.

19. An apparatus for enhancing isolation of user space from kernel space, comprising:
  a memory configured to store an instruction; and
  a processor coupled to the memory and configured to execute the instruction to:
    create extended page tables comprising at least a user-mode extended page table and a kernel-mode extended page table, wherein the user-mode extended page table is to be called when a virtual machine executes user-mode code by a processor running the virtual machine, and wherein the kernel-mode extended page table is to be called when the virtual machine executes kernel-mode code by the processor running the virtual machine; and perform mapping processing on the user-mode extended page table and/or the kernel-mode extended page table, wherein performing the mapping processing on the user-mode extended page table comprises mapping some or all page-table pages in a guest page table that are for translating a kernel-mode guest virtual address to an invalid page-table page using the user-mode extended page table, and wherein performing the mapping processing on the kernel-mode extended page table comprises mapping some page-table pages in the guest page table that are for translating a user-mode guest virtual address to the invalid page-table page using the kernel-mode extended page table.

20. A computer program product comprising computer-readable instructions for storage on a non-transitory computer-readable medium that, when executed by a processor, cause an apparatus to:

create extended page tables comprising at least a user-mode extended page table and a kernel-mode extended page table, wherein the user-mode extended page table is to be called when a virtual machine executes user-mode code by a processor running the virtual machine, and wherein the kernel-mode extended page table is to be called when the virtual machine executes kernel-mode code by the processor running the virtual machine; and perform mapping processing on the user-mode extended page table and/or the kernel-mode extended page table, wherein performing the mapping processing on the user-mode extended page table comprises mapping some or all page-table pages in a guest page table that are for translating a kernel-mode guest virtual address to an invalid page-table page using the user-mode extended page table, and wherein performing the mapping processing on the kernel-mode extended page table comprises mapping some page-table pages in the guest page table that are for translating a user-mode guest virtual address to the invalid page-table page using the kernel-mode extended page table.

* * * * *